Patented Dec. 29, 1953

2,664,418

UNITED STATES PATENT OFFICE 2,664,418

PROCESS FOR PRODUCTION OF STREPTOMYCYLAMINES

Walter A. Winsten, Forest Hills, N. Y., assignor to Food Research Laboratories, Inc., Long Island City, N. Y., a corporation of New York No Drawing. Application May 26, 1950, Serial No. 164,597

3 Claims. (Cl. 260—210)

This invention relates to novel derivatives of streptomycin, and in particular is directed to the discovery of unique properties of N-substituted streptomycylamines.

In my pending application for Letters Patent, Serial No. 43,349, I have described novel derivatives of streptomycin characterized by the structure:

Strep. $CH_2NHR$ wherein the symbol Strep designates the portion of the streptomycin molecule linked to its aldehyde group —CHO, and R designates a substituent such as aliphatic having at least 3 carbon atoms, aromatic or a combination thereof. The compounds therein described were found to possess $R_F$ values that are markedly higher than the $R_F$ value of the parent molecule streptomycin.

In continuing the investigations of this unique class of compounds I have found that a particular segment thereof possesses unusual bactericidal and fungicidal properties, such properties being surprisingly limited to the compounds of the type structure above described wherein R designates the radicals in the range from about seven carbon atoms to sixteen carbon atoms. The actual range for a specific organism may be somewhat narrower than the indicated range.

In the following examples and tables there are set forth the results of antibacterial and antifungal experiments carried out with a variety of organisms.

EXAMPLE 1

*Antibiotic activity of streptomycylamines against E. coli*

A methanol solution (200 ml.) of the calcium chloride double salt of streptomycin trihydrochloride (14.9 gm., 0.01 mole) and n-decylamine (9.4 g., 0.06 mole) was reduced under 1000 p. s. i. of hydrogen at 80–85° C. in the presence of 5 per cent palladium catalyst (5 gm.). After six hours, heating was discontinued and the hydrogenation was allowed to proceed 18 hours. The catalyst was filtered off, washed with methanol and the combined filtrate and washings were poured into 10 volumes of absolute ether with stirring. The precipitate was filtered off, washed with ether and dissolved in distilled water. The solution was adjusted from pH 8 to pH 5.5 with hydrochloric acid, frozen and lyophilized, and there was obtained the N-n-decyl and streptomycylamine in a yield of 13.2 grams.

The crude product was purified via the tetrahelianthate route from which the pure tetrahydrochloride was obtained by the method of purifying streptomycin described by Folkers et al., J. American Chem. Soc., 68, 1460 (1946).

In similar manner there were prepared the other members of this class of compounds running from the N-n-propyl streptomycylamine to the N-n-octadecyl streptomycylamine.

The antibiotic activity of these compounds against *E. coli* was determined by the United States Food and Drug Administration test (Federal Register, 12, 2224–5, (April 4, 1947)).

TABLE I

| Compound | E. coli activity calculated as γ[1] streptomycin/mg. |
|---|---|
| Streptomycin·3HCl | [2]841 |
| Streptomycylamine | 465 |
| N-n-propyl streptomycylamine | [3]70 |
| N-n-butyl streptomycylamine | [3]66 |
| N-n-octyl streptomycylamine | 238 |
| N-n-decyl streptomycylamine | 625 |
| N-n-dodecyl streptomycylamine | 1,000 |
| N-n-tetradecyl streptomycylamine | 765 |
| N-n-hexadecyl streptomycylamine | 240 |
| N-n-octadecyl streptomycylamine | [3]100 |

[1] gamma.
[2] NOTE.—As an example, this definition of activity may be better understood by noting that 1,000 γ of streptomycin·3HCl has an activity of 841 γ of streptomycin whereas 1,000 γ of the N-n-propyl streptomycylamine has only the equivalent activity of 70 γ of streptomycin.
[3] Impure compounds.

EXAMPLE 2

*Action of N-substituted streptomycylamines against fungi*

(a) *Monilia albicans* ATCC 2091

In test tubes containing 8 cc. of sterile mycophil broth there were added 1 ml. of sterile human blood serum (or water as indicated below), and 1 ml. (or less as indicated below) of a 0.2% solution (sterilized by boiling) of the substance to be tested. There was also added 0.1 ml. of a 48 hour culture of *M. albicans* (American Type Culture Collection (ATCC) 2091) grown at 30° C. The incubation of the tubes was carried out up to four days at 30° C. and the growth was observed. At the end of two days, however, the materials were subcultured into plain mycophil broth and incubated and observed after one and three days at 30° C.

On adding the compounds to the original media some precipitation occurred which made reading of the growth a little difficult; and hence, recourse to sub-culture was deemed expedient. It is to be noted that in evaluating the streptomycylamines, agar which inhibits the action thereof should not be present. The agar plate test therefore cannot be used.

In this example the following compounds were tested, and are designated by the compound numbers indicated.

| Compound | No. |
|---|---|
| N-n-butyl streptomycylamine | 1 |
| N-n-hexyl streptomycylamine | 2 |
| N-n-heptyl streptomycylamine | 3 |
| N-n-octyl streptomycylamine | 4 |
| N-n-decyl streptomycylamine | 5 |
| N-n-dodecyl streptomycylamine | 6 |
| N-n-tetradecyl streptomycylamine | 7 |
| N-n-hexadecyl streptomycylamine | 8 |
| N-n-octadecyl streptomycylamine | 9 |

TABLE II

[48 hour subculture read 24 hours after subculture.]

| Ml. of 0.2% solution in original tube | Compound No. | | | | | | | | |
|---|---|---|---|---|---|---|---|---|---|
| | 1 | 2 | 3 | 4 | 5 | 6 | 7 | 8 | 9 |
| 1.0 | [1]+ | + | + | [2]− | − | − | − | − | + |
| 0.5 | + | + | + | + | + | + | + | + | + |
| 0.2 | + | + | + | + | + | + | + | + | + |

[1] In this and the following tables + indicates growth.
[2] In this and the following tables − indicates no growth.

At the end of three days, all the tubes were positive. Thus, compounds 4 through 8 inclusive were sufficiently fungistatic at the 1 ml. level to hold the organism for 24 hours after subculture into media free of the antibiotics.

At the end of 4 days of incubation, the original tubes containing the antibiotics were read with some difficulty, due to the precipitate formed on adding the compounds to the medium. The results thereof are shown in the following table.

TABLE III

[Tubes read after 4 days in the presence of the antibiotic.]

| Ml. of 0.2% solution in original tubes | Compound No. | | | | | | | | |
|---|---|---|---|---|---|---|---|---|---|
| | 1 | 2 | 3 | 4 | 5 | 6 | 7 | 8 | 9 |
| 1.0 | [1]−? | + | − | − | − | − | − | − | − |
| 0.5 | −? | + | + | + | + | −? | − | − | − |
| 0.2 | + | + | + | + | + | −? | − | − | − |

[1] In this and the following tables "?" indicates difficulty in deciding, by gross inspection, whether the organism was present or not.

It is evident that even the lowest concentrations of compounds 7, 8 and 9 possess inhibitory powers. Of these, 7 and 8 are better than 9 since on sub-culture (see Table II) 9 failed to reduce the count as much as 7 and 8. For this test the peak activity is probably given by N-n-tetradecyl streptomycylamine and the corresponding N-n-hexadecyl derivative.

The fact that these compounds, i. e., the most effective members of the group are active against *M. albicans* even in the presence of human serum which inhibits most fungistatic and fungicidal agents, is of great significance and importance. These compounds are accordingly of great value for topical use against monilial vulvo vaginitis and other infections due to monilia.

The fungicidal activity of these streptomycylamines against *Monilia albicans* is further demonstrated in the following table. To five ml. of a solution of N-n-dodecyl streptomycylamine in water, 0.5 ml. of a 48 hour culture of *M. albicans* was added. After 5 minutes and 15 minutes at 37° C. subcultures were made and read after two days at 30° C.

TABLE IV

| Time | Concentration of N-n-dodecyl streptomycylamine | | |
|---|---|---|---|
| | 2% | 0.2% | 0.02% |
| 5 minutes | − | − | + |
| 15 minutes | − | − | − |

When streptomycylamine and dihydrostreptomycin were used as test substances in the same way, those antibiotics failed to inhibit at all.

In a similar test the following compounds gave results set forth in the table below:

TABLE V

| Compounds and concentrations | Time | |
|---|---|---|
| | 5 min. | 15 min. |
| N-n-decyl streptomycylamine: | | |
| 2% | − | − |
| 0.2% | + | + |
| N-n-propyl streptomycylamine: | | |
| 2% | + | + |
| 0.2% | + | + |
| N-n-hexadecyl streptomycylamine: | | |
| 2% | − | − |
| 0.2% | − | − |
| N-n-cyclohexyl ethyl streptomycylamine: | | |
| 2% | + | + |
| 0.2% | + | + |
| N-n-cyclohexyl hexyl streptomycylamine: | | |
| 2% | − | − |
| 0.2% | + | + |

It will be observed that the N-n-dodecyl and the N-n-hexadecyl derivatives are the best of the straight chain types. The N-n-propyl appears to be ineffective in the test. It also will be noted that the molecular size of the substituent is important. Thus when the substituent contains an alicyclic group it should be linked to a relatively long chain. Thus the cyclohexyl derivative inhibits where the cyclohexyl ethyl derivative does not inhibit.

(b) Tricophyton Interdigital ATCC 9375

A 10 day old culture of the organism in mycophil broth was shaken with beads and filtered through a coarse filter aseptically. 0.1 ml. was used as the inoculum for tubes containing 8 ml. of mycophil broth, 1 ml. of sterile human plasma (or 1 ml. of water), and 1 ml. or less of an 0.2% solution of the compounds numbers 1-9, as designated above. While the addition of the solutions of the compounds caused precipitates to form in the medium this did not interfere as much as it did in the tests with *M. albicans* because the mycelial growth of the Tricophyton is easily recognized.

The results of this test are given in the following table, the readings having been made at the end of 7 days, and at 30° C.

TABLE VI

| Ml. of 0.2% solution of compounds | Compound Nos. | | | | | | | | |
|---|---|---|---|---|---|---|---|---|---|
| | 1 | 2 | 3 | 4 | 5 | 6 | 7 | 8 | 9 |
| 1.0 | + | + | ? | − | − | − | − | − | − |
| 0.5 | + | + | + | − | − | − | − | − | − |
| 0.1 | + | + | + | + | + | + | + | − | + |

The tubes were also read after 10 days. Negative tubes were subcultured and the subcultures were read after an additional 10 days. The results of this phase of the test are shown in the following table.

TABLE VII

| 10 day readings in tubes and in subcultures prepared from the negative cultures | Compound Nos. | | | | | | | | |
|---|---|---|---|---|---|---|---|---|---|
| | 1 | 2 | 3 | 4 | 5 | 6 | 7 | 8 | 9 |
| Ml. of 0.2% solution: | | | | | | | | | |
| 1.0 | + | + | – | – | – | – | – | – | – |
| Subculture of 1.0 | – | – | – | (¹) | – | – | – | – | – |
| Ml. of 2% solution: | | | | | | | | | |
| 0.5 | + | + | – | – | – | – | – | – | + |
| Subculture of 0.5 | – | – | – | (¹) | – | – | – | – | – |
| Ml. of 2% solution: | | | | | | | | | |
| 0.1 | + | + | + | + | + | + | + | ? | + |
| Subculture of 0.1 | – | – | – | (¹) | – | – | – | + | – |

¹ A bacterial contamination was observed.

It will be noted that 0.5 ml. of the 0.2% solution (in about 10 ml. of test solution) of compounds 3 through 8 inhibit Tricophyton interdigital. It will also be noted that a subculture of the organism fails to grow out when taken from previously negative tubes showing that in the presence of serum in this test the compounds are fungicidal as well as fungistatic. This is in contrast to the action on *M. Albicans* where in that test only a fungistatic action is observed. The peak activity against Tricophyton appears to be within the range of the N-n-heptyl streptomycylamine through the N-n-hexadecyl streptomycylamine. A further test was carried out in the investigation of the properties of these streptomycylamines. The technique employed was that of standard phenol coefficient test of the U. S. Food and Drug Administration Bulletin 198 but modified as to medium and organism used.

A 4% solution of each compound was sterilized by boiling. Then 2.5 cc. of each solution was diluted with 2.5 cc. of water or 2.5 cc. of 20% sterile human blood serum. In another set of experiments there was added to 0.25 ml. of each test solution 4.75 cc. of water or 2.25 cc. of water plus 2.5 cc. of 20% human blood serum. To each tube there was added 0.5 cc. of filtered culture (10 day cultures of mycophil broth shaken with beads and filtered through coarse sterile filters).

In the tests all the tubes were held at 37° C. in a water bath. After 5 minutes and 15 minutes of contact time, transplants to plain sterile mycophil broth were made. The transplants were incubated for 10 days at 30° C. and read. The results of these experiments are set forth in the following table.

TABLE VIII

| Compound and concentration | 5 min. | 15 min. |
|---|---|---|
| N-n-hexyl streptomycylamine: | | |
| 2% | | |
| 2% (serum) | + | – |
| 0.2% | + | – |
| 0.2% (serum) | (¹) | – |
| N-6-cyclohexyl hexyl streptomycylamine: | + | – |
| 2% | | |
| 2% (serum) | – | – |
| 0.2% | – | – |
| 0.2% (serum) | – | – |
| N-n-decyl streptomycylamine: | | |
| 2% | | |
| 2% (serum) | – | – |
| 0.2% | – | – |
| 0.2% (serum) | – | – |
| N-n-hexadecyl streptomycylamine: | | |
| 2% | | |
| 2% (serum) | ²+ | ²+ |
| 0.2% | | |
| 0.2% (serum) | – | – |

¹ A bacterial contamination was observed.
² This anomalous result, at high concentration as contrasted with the 0.2% below which cause inertia, appears to be due to the presence of a contaminant.

These results show that even in the presence of serum the compounds tested will "kill" in 5 to 15 minutes at one or both of the concentrations employed. It will be noted that the N-6-cyclohexyl hexyl streptomycylamine and the N-n-decyl "kill" sooner and at lower concentrations.

It will be understood that the foregoing description of this invention is merely illustrative of its principles, and, accordingly, the appended claims are to be construed as defining the invention within the full spirit and scope thereof.

I claim:

1. Method of preparing compounds of the formula Strep—$CH_2$—NHR wherein "strep" designates the entire molecular structure of streptomycin except the aldehydic radical thereof, and R designates an aliphatic hydrocarbon radical of from 7 to 16 carbon atoms, which comprises mixing a methanolic solution of streptomycin trihydrochloride calcium chloride double salt with a primary aliphatic amine, having from 7 to 16 carbon atoms, and subjecting said mixture to hydrogenation at a temperature of about 80°–85° C. with hydrogen under a pressure of about 1000 p. s. i. in the presence of a hydrogenation catalyst.

2. Method in accordance with claim 1 wherein the temperature of 80°–85° C. is maintained for about 6 hours.

3. Method in accordance with claim 2 wherein the hydrogenation, after cessation of the heating to 80°–85° C., proceeds for about 18 hours.

WALTER A. WINSTEN.

No references cited.